Nov. 28, 1961  W. M. CAREY, JR  3,011,065
HIGH FREQUENCY STEERING CIRCUIT
Filed June 22, 1960
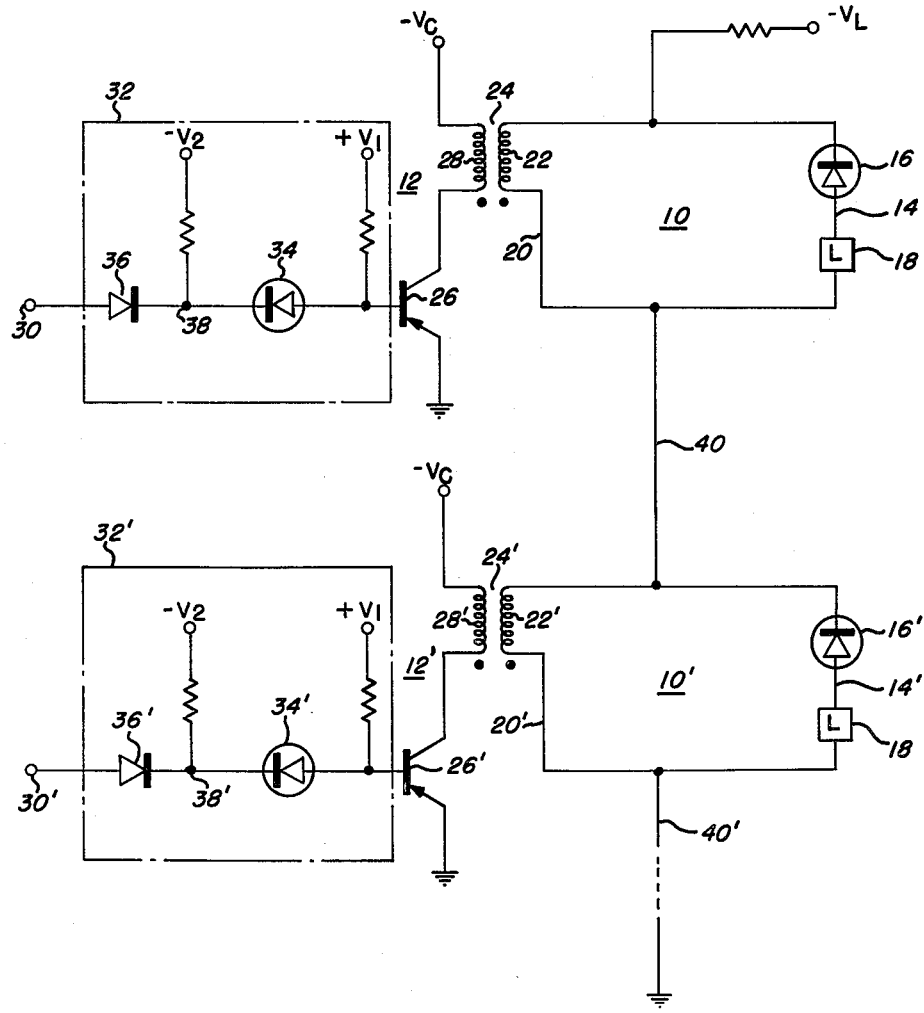
INVENTOR.
WILLIAM M. CAREY JR.
BY
Fred Jacob
ATTORNEY United States Patent Office 3,011,065
Patented Nov. 28, 1961

3,011,065
HIGH FREQUENCY STEERING CIRCUIT
William M. Carey, Jr., Lincoln, Mass., assignor to Minneapolis-Honeywell Regulator Company, Minneapolis, Minn., a corporation of Delaware
Filed June 22, 1960, Ser. No. 38,048
15 Claims. (Cl. 307—88.5)

This invention relates in general to a new and improved steering circuit, in particular, to a circuit for steering a relatively large current through a desired one of a plurality of paths by exercising control with a relatively small current.

It is frequently desirable, particularly in computer circuitry, to steer a load current through a conductive path which is composed of a number of separately selectable path sections. A convenient way of carrying out this objective is to provide a switching transistor in each section of the current path, together with appropriate control circuitry to render it conductive in accordance with the current path selection. Once the desired conductive path has been completed, the load current is steered through the loads which are connected in the respective path sections.

This technique, while simple to implement and carry out, is directly dependent upon the characteristics of the switching transistors which are employed. Heretofore, the control of currents of relatively large magnitude, i.e. upward of 250 ma. at frequencies in excess of 50 kc., has presented a formidable problem. Presently available load transistors, which are capable of taking currents of the order of 250 ma. across their emitter-collector junction, have relatively low switching speeds and are not suitable for operation at frequencies upward of 50 kc. which are common in present-day computer circuits.

Although the above-discussed problem has been attacked in many different ways with varying degrees of success, the resultant circuits heretofore available for steering relatively large currents at high frequencies have generally been elaborate in construction, inflexible in their application, and difficult to maintain in proper working order because of the critical nature of their components.

Accordingly, it is a primary object of this invention to provide a circuit for steering relatively large load currents at high frequencies which is not subject to the foregoing disadvantages.

It is another object of this invention to provide a steering circuit which is simple in construction, easy to maintain and which is flexible in its application.

In brief, the invention employs pairs of current paths which are connected in series with each other and with a single load current source. A separate control circuit is provided for each pair and is selectively adapted to control the voltage across one path thereof. The condition of a threshold device which is disposed in the other path is thus dependent upon the controlled voltage. Since a low current level is sufficient to carry out the operation, a quick and decisive steering control action is obtainable.

The various novel features which characterize the invention are pointed out with particularity in the claims annexed to and forming a part of this specification. For a better understanding of this invention, its advantages and specific objects thereof, reference should be had to the following detailed description and the accompanying drawing, the single figure of which illustrates a preferred embodiment of the invention.

With reference now to the drawing, the illustrated steering circuit is seen to include a plurality of series-connected pairs of current path sections 10, 10', etc., respectively associated with a corresponding control circuit 12, 12', etc. A gating circuit 32, 32', etc. is respectively associated with each control circuit. Within the limits of practical considerations, the total possible number of these combinations depends upon the desired steering current path that is to be connected. The broken lines in the drawing accordingly indicate that further additions are possible. Since the respective pairs of current path sections as well as their corresponding steering and gating circuits are identical, it will suffice to describe one of these combinations.

The pair of current path sections 10 consists of a first section 14 which contains a threshold device 16 connected in series with a load 18. The threshold device may consist of either a silicon diode, a Zener diode or the like, which is adapted to break down and to present a forward dynamic impedance which is substantially zero when the voltage across it exceeds a predetermined threshold level. The path section 14 is connected in parallel with a second path section 20 which contains the secondary winding 22 of a transformer 24. The pair of current path sections 10 is resistively coupled to a source of load current $-V_L$. Subsequent pairs are connected in series between the first pair and ground by means of conductive links 40, 40', etc. so as to complete the circuit to the other terminal of the load current source $-V_L$.

The control circuit 12 includes a switching transistor 26 which is adapted to handle relatively small currents of the order of 25 ma., and which has an extremely high switching speed. The emitter of the transistor 26 is connected to ground, while the collector is connected to the primary winding 28 of the aforementioned transformer 24. The transformer windings 22 and 28 have a predetermined winding ratio and are poled as indicated by the dot notation in the drawing. The other terminal of the primary winding 28 is connected to a negative D.C. source $-V_C$ which supplies the control current.

The base of the transistor 26 is energized from a pulse source 30 which is shown to be coupled to the base of the transistor 26 by means of a gating circuit 32. The latter may be of the type disclosed in a copending application by Joseph J. Eachus, entitled "Electrical Signal Gating Apparatus," Serial Number 614,839, filed October 9, 1956, and assigned to the assignee of the instant application. In brief, the gating circuit 32 comprises a silicon diode 34 which is connected between the base of the transistor 26 and a germanium diode 36, the latter being connected to the aforementioned pulse source 30 and being poled in opposition to the silicon diode. The diodes 34 and 36 respectively are connected to a common junction point 38 which is resistively coupled to a negative D.C. source $-V_2$. The output connection of the gating circuit 32, which is connected to the base of the transistor 26, is resistively coupled to a positive D.C. source $+V_1$.

As explained in the above-mentioned patent application, the gating action of the circuit 32 is based on the different threshold potentials of the germanium and silicon diodes respectively. In operation, the precise steering path for the load current which is derived from the source $-V_L$ is determined by the selective application of pulses from the pulse sources 30 and 30' respectively. Prior to the application of a pulse by either one of these pulse sources, the transistors 26, 26', etc. are cut off and the voltage drop across the primary transformer windings 28, 28', etc. is Zero. The voltage across the secondary windings 22, 22', etc. is then entirely due to the IR drop in these windings, and is insufficient to cause the voltage across the threshold diodes 16, 16', etc. to exceed their respective thresholds.

The forward resistance of threshold diode 16 is sufficiently large to cause the impedance of the path section 14 to exceed the direct impedance of the path section 20, there being no coupled impedance as long as the primary transformer winding 28 has no current flowing in it. A similar situation obtains in the path section pair 10', the impedance of the path section 20' being below that of the path section 14'. Accordingly, the steering path of the load current is as follows: From the source —V_L through the path section 20, through the conductive links 40 which connects the respective path section pairs 10 and 10', through the path section 20' and through the link 40' to ground.

If it is desired to steer current through the load 18 only, but not through the load 18', a pulse is applied to the gating circuit 32 by the pulse source 30. In accordance with the operation of the gating circuit, the output signal is applied to the base of the transistor 26 to render it conductive. The connection between the source —V_C and ground having thus been completed, a flow of control current will occur which will produce a voltage of a predetermined amplitude across the primary transformer winding 28. The turns ratio of the transformer 24 is so chosen that the resultant voltage across the secondary winding 22 is sufficiently large to cause the voltage drop across the threshold diode 16 to exceed the threshold of the latter. The subsequent current flow through this diode reduces its forward impedance substantially to zero. The impedance of the path section 14 is thus reduced below that of the path section 20 so that substantially all the load current flows through the path section 14.

Since no pulse was applied to the gating circuit 32', a similar action does not take place in the current path section pair 10'. Accordingly, the threshold diode 16' remains in its cut-off state and the current from the source —V_L, after traversing the path section 14 and the link 40, flows through the path section 20', through the link 40' and subsequently to ground.

By selectively pulsing only the gating circuit 32', or by pulsing both gating circuits, two additional combinations of the current path sections may be effected. With the circuit described above, four different combinations of the current path sections 14, 14', 20 and 20' are possible to provide an equal number of different steering paths for the load current. It will be readily apparent that the addition of further pairs of current path sections will provide a corresponding increase in the number of different possible steering paths.

The circuit disclosed herein is not confined to the precise configuration which is illustrated. Thus, the gating circuits 32, 32' etc. may be replaced by circuits which are functionally equivalent in operation. Similarly, the invention is not limited to the use of the transistor switches 26, 26', etc., provided only that an equivalently fast-acting short-circuiting switch which operates at relatively low control current amplitudes is employed. The threshold devices 16, 16', etc. are not limited to silicon diodes. The substitution of Zener diodes therefor, or any diode having a reference voltage level, being readily apparent.

The loads 18, 18', etc. need not be located in the respective current path sections 14, 14', etc. For example, loads may be placed in the current path sections 20, 20', etc. respectively, or loads may be located in both current path sections of a pair. Care must be taken, however, that the total impedance of each path section 20, 20', etc. is less than the impedance of its corresponding path section 14, 14', etc. when the threshold device is non-conductive.

It will be readily apparent to those skilled in the art that the upper terminal of each of the transformer primary windings 28, 28', etc. may be connected to the same source —V_C. If additional steering paths are to be provided, additional pairs of current path sections may be connected between the source —V_L and ground. In the latter case, the secondary transformer winding of each pair thus added would be inductively coupled to the existing primary transformer winding for simultaneous control with the existing pair of current path sections.

With the above-described invention, it is possible to steer relatively large load currents by using small control currents which may be switched at very high frequencies. The objects of the invention are carried out with an extremely simple and reliable circuit construction which is not critically dependent upon the parameters of the components employed. The resultant circuit is sufficiently flexible to be readily incorporated in a larger circuit to provide different desired current steering paths in the latter.

It will be apparent from the foregoing disclosure of the invention that numerous modifications, changes and equivalents will now occur to those skilled in the art, all of which fall within the true spirit and scope contemplated by the invention.

What is claimed is:

1. A steering circuit comprising a plurality of pairs of first and second current path sections connected in parallel, successive pairs being connected in series with each other between opposite terminals of a load current source, each of said pairs including a normally non-conductive threshold device connected in series in said first path section, a transformer associated with each of said pairs and having its secondary winding connected in the second path section thereof, a control circuit associated with each of said pairs including a control current source and a normally non-conductive transistor connected in series with the primary winding of the associated transformer, and means for selectively rendering each of said transistors conductive to cause a current flow in the associated control circuit, said current flow producing a voltage across the transformer primary winding connected in said control circuit, the turns ratio of each of said transformers being chosen to produce a voltage across the corresponding secondary winding sufficient to render said threshold device conductive and to transfer substantially the entire load current flow from said second path section to said first path section.

2. A steering circuit comprising a plurality of pairs of first and second current path sections connected in parallel, successive pairs being connected in series with each other, a threshold device connected in each of said first path sections adapted to maintain the latter normally non-conductive, a transformer having a secondary winding connected in each of said second path sections, a control circuit associated with each of said pairs including a normally non-conductive transistor connected in series with the primary winding of the corresponding transformer, a control current source connected to each of said control circuits, and means for rendering selected ones of said transistors conductive to cause a control current flow in the connected transformer primary windings, the turns ratio of each of said transformers being chosen to produce a resultant voltage across each secondary winding thus selected sufficient to render its corresponding threshold device conductive, whereby the impedance of the first path section of each selected pair is lowered below that of the corresponding second path section.

3. A steering circuit comprising a plurality of pairs of current path sections connected in series with each other, each of said pairs including a first path section containing a normally non-conductive threshold device, a second path section connected in parallel with said first path section and containing the secondary winding of a transformer, the impedance of said second path section being normally less than the impedance in the corresponding direction of said first path section, each of said transformers further including a primary winding having a predetermined turns ratio with respect to said secondary winding, and means for energizing selected ones of said primary windings to produce a voltage across the corresponding secondary winding sufficient to cause the threshold of said threshold device to be exceeded, said last-recited action being adapted to lower the impedance of said threshold device to an extent where the impedance of the associated second path section exceeds that of the corresponding first path section.

4. The apparatus of claim 3 wherein each of said first path sections further includes a load connected in series with said threshold device, and a source of load current connected in series with said pairs of current path sections.

5. The apparatus of claim 3 wherein each of said energizing means includes a source of control current and a normally non-conductive transistor connected in series with the corresponding primary winding, and means for selectively pulsing said transistor to render it conductive.

6. A steering circuit comprising a plurality of pairs of current path sections connected in series with each other, each of said pairs including a first path section containing a normally non-conductive threshold device, a second path section connected in parallel with said first path section and containing the secondary winding of a transformer, the impedance of said second path section being normally less than the impedance in the same direction of said first path section, each of said transformers further including a primary winding having a predetermined turns ratio with respect to said secondary winding, a source of control current connected in series with each of said primary windings to form a control current path, and means for completing selected ones of said control current paths to energize the connected primary windings, the selective energization of each primary winding being adapted to produce a voltage across the related secondary winding sufficient to cause the threshold of the corresponding threshold device to be exceeded, said last-recited action being adapted to lower the impedance of said threshold device to an extent where the impedance of the associated second path section exceeds that of the corresponding first path section.

7. A steering circuit comprising at least a first current path containing a normally non-conductive threshold device, a second current path connected in parallel with said first path and containing the secondary winding of a transformer, the impedance of said second path being normally less than the impedance in the same direction of said first path, said transformer further including a primary winding having a predetermined turns ratio with respect to said secondary winding, and means for energizing said primary winding to produce a voltage across the related secondary winding in excess of the threshold of the corresponding threshold device, said last-recited action being adapted to lower the impedance of said threshold device to an extent where the impedance of the associated second path exceeds that of the corresponding first path.

8. A steering circuit comprising at least one pair of current paths connected in parallel, a threshold device normally adapted to maintain one of said paths non-conductive, a transformer having a secondary winding disposed in the other one of said paths, and means for selectively producing current flow in the primary winding of said transformer, the turns ratio of said transformer being chosen to provide a voltage across said secondary winding upon the occurrence of current flow in said primary winding sufficient to cause said threshold device to render said one path conductive substantially to the exclusion of said other path.

9. A steering circuit comprising a plurality of pairs of current path sections each including first and second path sections connected in parallel, successive pairs being connected in series with each other, a threshold device disposed in each of said first path sections and normally adapted to maintain the latter non-conductive, and a transformer associated with each of said pairs and having its secondary winding disposed in the second path section thereof, the turns ratio of each of said transformers being chosen to provide a voltage across its secondary winding upon the occurrence of current flow in its primary winding sufficient to cause the threshold device of the affected second path section to render the latter conductive to the exclusion of the corresponding first path section.

10. A steering circuit comprising at least first and second current paths connected in parallel, a threshold device disposed in said first path, a transformer having a secondary winding disposed in said second path, means for applying a current to said parallel-connected paths, the total voltage drop in said second path due to said current being chosen to prevent the threshold of said threshold device from being exceeded and to preclude current flow in said first path, and means for selectively applying a voltage across the primary winding of said transformer, said last-recited voltage being chosen to produce a voltage across said secondary winding sufficient to render said threshold device conductive and to switch current flow from said first to said second path.

11. A steering circuit comprising at least first and second current paths connected in parallel, a threshold device connected in said first path and being adapted to maintain the latter normally non-conductive, a transformer having a secondary winding connected in said second path, a control circuit including a normally non-conductive transistor connected in series with the primary winding of said transformer, a control current source connected in said control circuit, and means for selectively rendering said transistor conductive to produce a flow of control current in said transformer primary winding, the turns ratio of said transformer being chosen to cause the resultant voltage across said secondary winding to render said threshold device conductive.

12. A steering circuit comprising a plurality of pairs of current path sections connected in series with each other between the terminals of a source of load current, each of said pairs including a first path section containing a normally non-conductive threshold diode, a second path section connected in parallel with said first path section and containing the secondary winding of a transformer, the impedance of said second path section being normally less than the impedance of said first path section, each of said transformers further including a primary winding having a predetermined turns ratio with respect to said secondary winding, a control circuit associated with each of said pairs and including a source of control current connected to one terminal of one of said primary windings, a switching transistor having its collector connected to the other terminal of said primary winding and its emitter connected to ground, means for biasing each of said transistors to maintain it normally in a non-conductive state, and means for selectively pulsing the base of each of said transistors to render it conductive and to cause a current flow in the associated control circuit, said current flow producing a voltage across the connected transformer primary winding, said turns ratio being chosen to provide a voltage across the corresponding secondary winding sufficient to cause the threshold of the corresponding threshold diode to be exceeded, said last-recited action being adapted to lower the impedance of said threshold diode to an extent where the impedance of the associated second path section exceeds that of the corresponding first path section.

13. The apparatus of claim 12 wherein each of said first path sections further includes a load connected in series with said threshold diode.

14. The apparatus of claim 12 wherein each of said first and second path sections further include a load connected in series therewith.

15. The apparatus of claim 12 wherein each of said second path sections further includes a load connected in series with said primary winding.

References Cited in the file of this patent
UNITED STATES PATENTS

| | | |
|---|---|---|
| 1,949,483 | Livingston | Mar. 6, 1934 |
| 2,722,629 | Germeshansen | Nov. 1, 1955 |